United States Patent
Boskovic

Patent Number: 5,853,606
Date of Patent: Dec. 29, 1998

[54] MOLD IDENTIFICATION DEVICE

[76] Inventor: Borislav Boskovic, 2102 Bannockburn, Inverness, Ill. 60067

[21] Appl. No.: 2,814

[22] Filed: Jan. 5, 1998

[51] Int. Cl.[6] ................................................ B29C 33/00
[52] U.S. Cl. ........................ 249/103; 249/140; 249/155; 425/192 R; 425/195
[58] Field of Search ..................... 249/103, 104, 249/140, 155; 425/190, 192 R, 195, 812; 164/229

[56] References Cited

U.S. PATENT DOCUMENTS

| 4,384,702 | 5/1983 | Boskovic | 249/103 |
| 4,708,314 | 11/1987 | Kuhling | 249/103 |
| 5,620,716 | 4/1997 | Opitz | 249/103 |

FOREIGN PATENT DOCUMENTS

| 1929875 | 6/1971 | Germany | 249/104 |
| 54-178774 | 12/1979 | Japan . | |
| 55-58317 | 4/1980 | Japan . | |
| 56-50898 | 11/1981 | Japan . | |

*Primary Examiner*—James P. Mackey
*Attorney, Agent, or Firm*—Lee, Mann, Smith, McWilliams, Sweeney & Ohlson

[57] ABSTRACT

An identification device for a mold for impressing identifying indicia on each product molded in the mold. A plug retaining insert includes at least one bore through a working face of the insert. A plug member is located in each bore, with the plug member comprising a plug substantially filling the bore proximate the face of the insert, and a shank extending axially into the bore from the plug. A retainer is threaded on the shank, and a spring, bearing against the retainer, seats the plug member in the bore. Indicia of various kinds are located on both the surface of the plug and the face of the insert, with the plug being rotatable to identify a selected portion of the indicia.

14 Claims, 2 Drawing Sheets

MOLD IDENTIFICATION DEVICE

BACKGROUND OF THE INVENTION

This invention relates to injection molding of plastic parts, and in particular to an identification device for impressing indicia on each part as it is molded in a plastic injection mold.

It is relatively common in plastic injection molding, for the purposes of quality control or identification, to have identifying indicia added to molded products as they are formed in a plastic injection mold. Typically, the date that the product is made, or in some situations, even the shift during the day that the product is formed, is impressed in the product in an unobtrusive location. In the past, the mold part bearing the indicia was regularly changed so that indicia was kept up-to-date, a rather costly endeavor. More recently, inserts for molds have been provided having replaceable and changeable information. U.S. Pat. No. 4,708,314 and Japanese references 54-178774, 53-141286 and 56-50898 are examples of such devices.

U.S. Pat. No. 4,384,702, invented by the inventor of the present application, is directed to a mold insert which can easily be installed in a mold and which has readily changeable indicia. While the insert can easily be removed from the mold, replacing of the parts thereof is difficult unless the insert is removed. Another device, which is similar, has been developed, having individual plugs which can be rotated to identify changing indicia, but which also, theoretically, can be removed from the face of the mold by simply unscrewing them. However, practice has shown that such devices are not reliably removable from the mold.

SUMMARY OF THE INVENTION

The invention is directed to an identification device for a mold for impressing indicia on each molded product formed in the mold. It comprises a plug retaining portion, with the plug retaining portion having a face shaped to form a working part of the mold when the identification device is located in the device. At least one bore is located extending through the face of the plug retaining portion. A plug member is located in each bore, with the plug member including a plug having a mold engaging surface adjacent the face and substantially filling the bore proximate the face. A shank extends axially into the bore from the plug, with the shank having a threaded portion at a distal end of the shank. A stop is provided on the shank proximate the threaded end, and a retainer is threadedly mounted on the threaded portion, bearing against the stop. Means is provided to seat the plug member in the bore, and a series of indicia is provided on at least one of the surface and the face adjacent the bore.

In accordance with the preferred form of the invention, the shank includes an unthreaded portion which extends between the plug and the threaded portion. The stop comprises an annular end of the unthreaded portion adjacent the threaded portion. Preferably, the unthreaded portion has a diameter greater than the threaded portion, thus forming the stop.

The bore includes an annular restriction surrounding at least a portion of the shank. The means seating the plug member in the bore comprises a spring which extends between the restriction and the retainer. The retainer preferably includes an end cap against which the spring bears, with the end cap being an integral portion of the retainer. The restriction is located in the bore beneath the plug, forming a recess between the restriction and the surface, with the plug being located in that recess.

In accordance with the preferred form of the invention, the plug retaining portion comprises an insert for a plastic injection mold. At least two of the bores are located in the insert. In one preferred form of the invention, the insert is cylindrical, although it may form others shapes, as well.

Means is provided for rotating the plug member about its axis. Preferably, the rotating means comprises a slot in the surface of the plug which is shaped to accommodate a screw driver blade.

BRIEF DESCRIPTION OF THE DRAWINGS

The invention is described in greater detail in the following description of examples embodying the best mode of the invention, taking in conjunction with the drawings figures, in which.

DESCRIPTION OF EXAMPLES EMBODYING THE BEST MODE OF THE INVENTION

Figure 1:
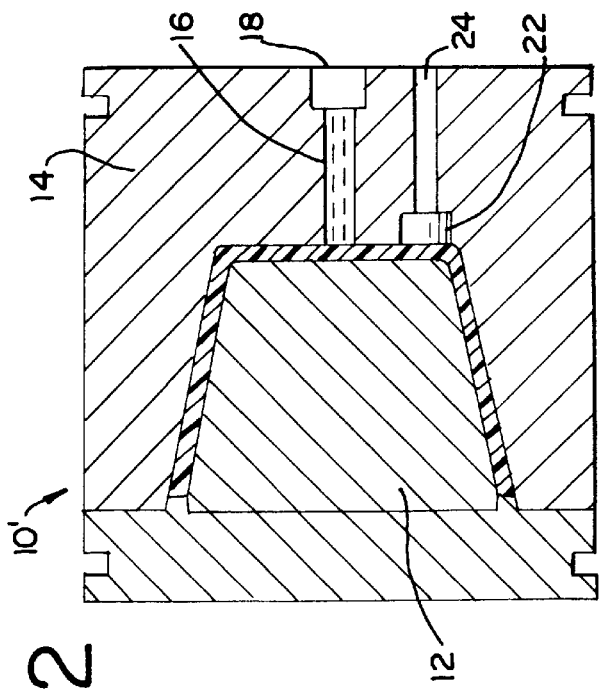
FIG. 1 is a cross-sectional illustration of a mold having an identification device according to the invention located in the mold core.

A mold incorporating one or more removable identification devices according to the invention is shown generally as 10 in FIG. 1. The mold includes a mold core 12, a mold cavity 14, and a mold inlet 16 having a gate 18 through which plastic material to be formed within the mold 10 is injected. A molded part is shown generally at 20 in FIG. 1.

An identification device 22 according to the invention is located within an aperture formed in the mold core 12. The identification device 22 can also be considered to be an insert, which is fitted within the aperture so that it is held securely in place. Preferably, it is pressure fitted in the aperture. A bore 24 leads from the insert 22 within the mold core so that the insert 22 can be removed, if required, by passing a long tool through the bore 24 to tap the insert 22 from the mold core 12.

Figure 2:
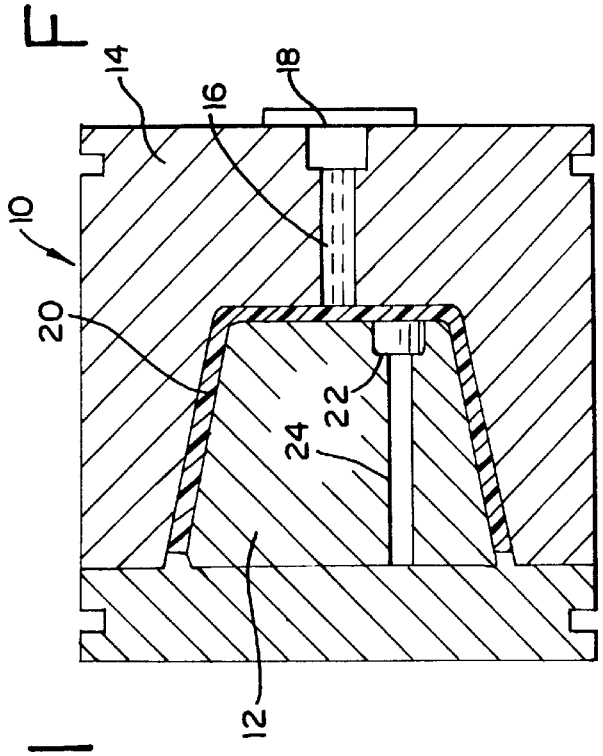
FIG. 2 is a cross-sectional illustration of a mold similar to that of FIG. 1, but including the identification device according to the invention located in the mold cavity.

FIG. 2 illustrates a mold 10' similar to that of FIG. 1, but in this form of the invention, the insert 22 is located in the mold cavity 14 rather than the mold core 12. Otherwise, the mold 10' is identical to the mold 10 of FIG. 1, and the insert 22 may also be identical.

Figure 3:
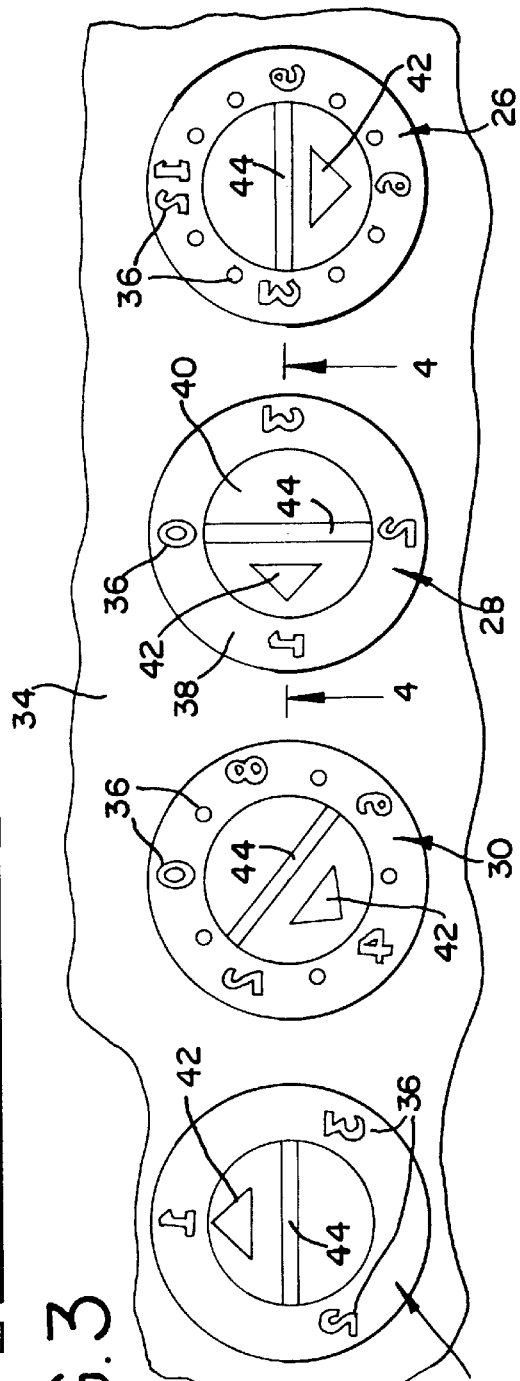
FIG. 3 is an enlarged top plan view of a series of inserts installed in a mold.

FIG. 3 illustrates a series of individual inserts 26, 28, 30 and 32 according to the invention which are installed in a portion of a mold body 34. Each of the inserts 26–32 includes a series of indicia 36. As will be apparent, the inserts 26–32 and the indicia are reversed so that the impressions on a molded article are easily readable. Other than the various indicia 36, the mold inserts 26–32 can each be identical to one another and to the insert 22.

Figure 6:
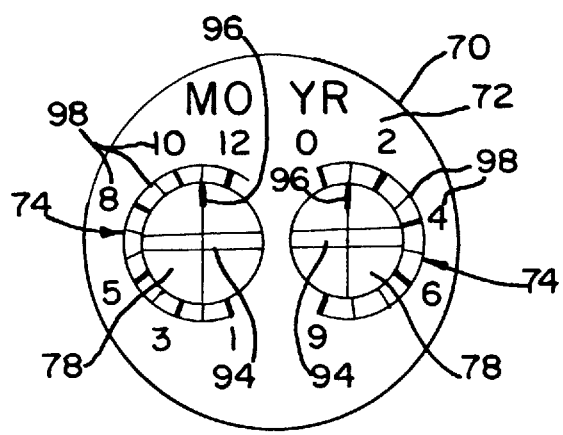
FIG. 6 is a plan view of a mold identification device according to the invention, having a pair of identifying plug members.

Each of the inserts 26–32 includes two primary portions, a plug retaining portion 38 and a plug member 40. As just explained, the inserts 26–32 may be individual members, or as illustrated in FIG. 6, an insert can be formed with two or more of the plug members 40. Each of the plug members 40 includes an indicator 42 and a transverse slot 44 for rotating of the plug members 40, as described in greater detail below in relation to FIGS. 6 and 7.

Figure 4:
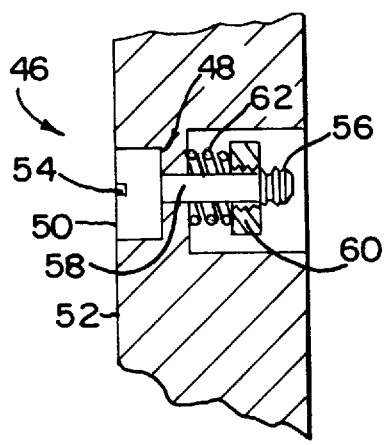
FIG. 4 is a cross-sectional illustration of a prior art version of a mold insert, showing its means of installation in a mold.
Figure 5:
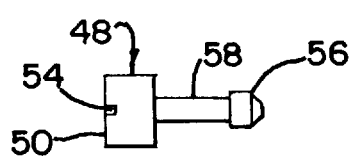
FIG. 5 is an elevational illustration of the rotatable part of the insert illustrated in FIG. 4.

FIGS. 4 and 5 illustrate a prior art identification device, of which the present invention is an improvement. A mold portion is shown generally at 46. A plug member 48 is installed in appropriate bores in the mold portion 46, with the plug member 48 therefore having a surface 50 generally coextensive with a face 52 of the mold portion 46. As most easily illustrated in FIG. 5, the plug member 48 includes a transverse slot 54 for rotation of the plug member, and an enlarged threaded tip 56 at the distal end of a relatively smaller shank 58. When installed in the mold 46, a nut 60 is threaded on the threaded tip 56. To retain the plug member 48 in place, a compression spring 62 bears between the nut 60 and a portion of the mold 46.

In use, the prior art device as illustrated in FIGS. 4 and 5 is assembled as illustrated, and when the plug member 48 is rotated in the clockwise direction by means of utilizing the slot 54, the nut 60 rotates freely on the relatively smaller unthreaded shank 58. Thus, so long as the plug member 48 is rotated in the clockwise direction, the plug member remains installed in the mold portion 46. The compression spring 62 always orients the plug member 48 with the surface 50 and the face 52 being generally coextensive.

When removal of the plug member 48 is desired, rotation of the plug member 48, by means of the transverse slot 54, in the counter clockwise direction theoretically causes the nut 60 to become re-engaged on the threaded tip 56. Thus, by rotating the plug member 48 a few revolutions in the counter clockwise direction, it can be entirely removed from the mold portion 46.

However, in practice, removal of the plug member 48 is not as simple as in theory. This is because after rotation of the plug member 48 in the clockwise direction, the nut 60 tends to wear down the entry to the threads of the threaded tip 56, so that when the plug member 48 is rotated in the counter clockwise direction, the threads of the threaded tip 56 do not engage the nut 60, but instead the nut 60 continues to spin freely on the shank 58 whichever direction the plug member 48 is rotated. As a consequence, in order to remove the plug member 48, the mold must be disassembled, a time-consuming project which is expensive both in terms of down time of the mold and labor involved.

Figure 7:
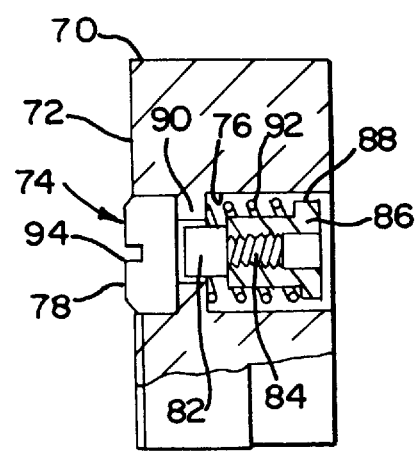
FIG. 7 is a typical cross-sectional illustration through one of the plug members of the identification device according to the invention, such as that illustrated in FIG. 6, and showing detail of the plug member and its means of being retained and seated within the bore.

The improvement of the invention avoids the problem of removing the plug member because of worn parts. As illustrated in FIGS. 6 and 7, a cylindrical plug retaining portion 70 is provided with a face 72 which forms a working portion of the mold in which it is installed. As illustrated in FIG. 6, such information such as the month or year can be embossed on the face 72, but obviously other information can also be provided. Each plug member 74 according to the invention is installed in a bore 76 formed in the retaining portion 70. The plug members 74 have a mold engaging surface 78 adjacent to the face 72 and substantially filling the bore 76 proximate the face 72.

Each plug member 74 comprises a plug 80 with a shank 82 extending axially into the bore 76. The shank 82 has a threaded portion 84 at a distal end of the shank. The remaining portion of the shank 82 is not threaded, and as illustrated in FIG. 7, it is preferred that this remaining portion is actually greater in diameter than the threaded portion 84.

A threaded retainer 86 is installed on the threaded portion 84, butting against the unthreaded portion of the shank 82 which therefore forms a stop immediately adjacent the threaded portion 84. The retainer 86 includes an integral end cap 88, as illustrated.

The bore 76 includes an annular restriction 90 which surrounds at least a portion of the unthreaded portion of the shank 82. For seating of the plug member 74 within the bore 76, a compression spring 92 bears between the annular restriction 90 and the end cap 88.

Each of the plugs 80 includes a transverse slot 94 and an indicator 96. By judicious rotation of the plug members 74, the indicators 96 may be aligned with certain of indicia 98 surrounding each of the plug members.

When the plug member 74 is rotated in the clockwise direction by means of the transverse slot 94, the retainer 86 screws onto the threaded portion 84, butting against the stop formed by the unthreaded portion of the shank 82. However, by rotation in the counter clockwise direction, the threaded portion 84 begins to unscrew from the retainer 86, and thus can be removed from the face side of the plug retaining portion 70 without disassembly of the mold. Unlike the prior art version illustrated in FIGS. 4 and 5, during normal use of the invention, there is no relative rotation of the plug member 74 in relation to the retainer 86, and thus when one desires o remove the plug member 74, rotation in the counter clockwise direction will disengage the plug member 74 from the retainer 86.

It is preferred that the unthreaded portion of the shank 82 be larger in diameter than the threaded portion 84, so that the retainer 86, when engaged on the threaded portion 84, butts against the unthreaded portion of the shank 82, which therefore forms the stop. Alternatively, the diameters of the unthreaded portion of the shank 82 and the threaded portion 84 can be the same, with the retainer 86 being engaged only on the threaded portion 84. The plug member 74 is preferably a unitary body, although alternatively it can be formed from two or more pieces which are permanently joined.

The compression spring 92 is a robust spring which preferably has minimal extension. Thus, the spring 92 bears firmly between the restriction 90 and the integral end cap 88 of the retainer 86, not only seating the plug member 74 properly within the bore 76, but also providing the necessary force against the retainer 86 so that when removal of the plug member 74 is desired, the spring 92 will tend to hold the retainer 86 when the plug member 74 is rotated in the counter clockwise direction.

In the above description, the terms "clockwise" and "counter clockwise" are relative terms, depending on the direction of threading of the threaded portion 84. Obviously, if the threaded portion 84 were formed with a reverse thread, then normal operation of the plug member 74 would be by rotation of the plug member 74 in the counter clockwise direction, and removal of the plug member 74 would be by means of rotation of the plug member 74 in the clockwise direction. The directions are therefore relative, depending on the threading of the threaded portion 84 and the corresponding threading internally in the retainer 86.

While it is preferred that the unthreaded portion of the shank 82 form the stop against which the retainer 86 bears, the retainer 86 can also be formed so that the threaded portion 84 bottoms in the retainer 86 to form the stop. In that instance, normally the threaded portion 84 would be slightly longer than the corresponding internally threaded portion of the retainer 86 to facilitate easy removal of the plug member 74 from the retainer 86.

Various changes can be made to the invention without departing from the spirit thereof or scope of the following claims.

What is claimed:

1. An identification device for a mold for impressing indicia on each molded product formed in the mold, comprising
   a. a plug retaining portion, said plug retaining portion having a face shaped to form a working part of the mold when the identification device is located in the mold,
   b. at least one bore in said plug retaining portion through said face,
   c. a plug member located in each said bore, said plug member including a plug having a mold engaging surface adjacent said face and substantially filling said bore proximate said face,
   d. a shank extending axially into said bore from said plug, said shank having a threaded portion at a distal end of said shank,
   e. a stop on said shank proximate said threaded portion,
   f. a retainer threadedly mounted on said threaded portion and bearing against said stop,
   g. means seating said plug member in said bore, and
   h. a series of indicia on at least one of said surface and said face adjacent said bore.

2. An identification device according to claim 1 in which said shank includes an unthreaded portion extending between said plug and said threaded portion.

3. An identification device according to claim 2 in which said stop comprises an annular end of said unthreaded portion adjacent said threaded portion.

4. An identification device according to claim 2 in which said unthreaded portion has a diameter greater than said threaded portion, forming said stop.

5. An identification device according to claim 1 in which said bore includes an annular restriction surrounding at least a portion of said shank, and said seating means comprises a spring extending between said restriction and said retainer.

6. An identification device according to claim 5 in which said retainer includes an end cap against which said spring bears.

7. An identification device according to claim 6 in which said end cap is an integral portion of said retainer.

8. An identification device according to claim 5 in which said restriction is located in said bore beneath said plug, a recess being formed between said restriction and said surface, said plug located in said recess.

9. An identification device according to claim 1 in which said plug retaining portion comprises an insert for the mold.

10. An identification device according to claim 9 in which said insert includes at least two of said bores.

11. An identification device according to claim 9 in which said insert is cylindrical.

12. An identification device according to claim 1 including means for rotating said plug member about its axis.

13. An identification device according to claim 12 in which said rotating means comprises a slot in said surface shaped to accommodate a screwdriver blade.

14. An identification device according to claim 1 in which said plug has a diameter greater than said shank.

\* \* \* \* \*